(12) United States Patent
McMahon

(10) Patent No.: US 6,391,091 B2
(45) Date of Patent: May 21, 2002

(54) HYGROSCOPIC MONOLITH

(76) Inventor: James P. McMahon, 615 Belknap, San Antonio, TX (US) 78212-4313

( * ) Notice: Subject to any disclaimer, the term of this patent is extended or adjusted under 35 U.S.C. 154(b) by 0 days.

(21) Appl. No.: 09/885,364

(22) Filed: Jun. 19, 2001

Related U.S. Application Data

(63) Continuation of application No. 09/157,208, filed on Sep. 18, 1998, now Pat. No. 6,280,504.

(51) Int. Cl.$^7$ ........................... B01D 53/04; B01D 53/28
(52) U.S. Cl. .............. 95/116; 95/117; 95/121; 95/148; 96/108; 96/188; 34/80; 34/472; 34/473; 34/474
(58) Field of Search ............. 96/108, 90, 182; 95/116, 117, 121, 148; 34/80, 472, 473, 474

(56) References Cited

U.S. PATENT DOCUMENTS

| | | |
|---|---|---|
| 2,519,296 A | 8/1950 | Simpson |
| 3,925,021 A | 12/1975 | Yoshino et al. |
| 4,012,206 A | 3/1977 | Macriss et al. |
| 4,726,817 A | 2/1988 | Roger ........................... 95/121 |
| 4,900,340 A | 2/1990 | Zuideveld et al. |
| 5,230,719 A | 7/1993 | Berner et al. |
| 5,242,473 A | 9/1993 | Ogasahara |
| 5,401,706 A | 3/1995 | Fischer |
| 5,510,063 A * | 4/1996 | Gadkaree et al. .......... 264/29.7 |
| 5,512,083 A | 4/1996 | Dunne |
| 5,575,832 A | 11/1996 | Boyd ........................... 95/117 |
| 5,681,370 A | 10/1997 | McMahon ................... 95/105 |
| 5,702,508 A | 12/1997 | Moratalla |
| 5,750,026 A | 5/1998 | Gadkaree et al. |
| 5,817,167 A | 10/1998 | DesChamps |
| 5,911,937 A | 6/1999 | Hekal ........................ 264/255 |

FOREIGN PATENT DOCUMENTS

| | | | |
|---|---|---|---|
| DE | 2164688 | 7/1972 | ................. 96/121 |
| DE | 3613884 | 10/1987 | ................. 96/108 |
| FR | 2592 318 | 7/1987 | ................. 96/108 |
| GB | 2198053 | 6/1988 | ................. 96/121 |
| JP | 53-99075 | 8/1978 | ................. 96/108 |
| JP | 55-061916 | 5/1980 | ................. 96/121 |
| JP | 56-078616 | 6/1981 | ................. 96/121 |
| JP | 58-008536 | 1/1983 | ................. 96/121 |
| JP | 58-027618 | 2/1983 | ................. 96/121 |
| JP | 58-047939 | 3/1983 | ................. 96/121 |
| JP | 63-286635 | 11/1988 | ................. 96/108 |
| JP | 04-300620 | 10/1992 | ................. 96/108 |
| JP | 05-000222 | 1/1993 | ................. 96/126 |
| JP | 05-007721 | 1/1993 | ................. 96/127 |

* cited by examiner

*Primary Examiner*—Robert A. Hopkins
(74) *Attorney, Agent, or Firm*—Akin, Gump, Strauss, Hauer & Feld, LLP

(57) ABSTRACT

A monolithic hygroscopic material shaped to facilitate a circulation flow of ambient air. The hygroscopic material may be used to remove various compounds from an ambient gas and may be reactivated to restore its drying capacity. The tendency of the material to seek equilibrium may be utilized to achieve dehumidification or humidification.

15 Claims, 6 Drawing Sheets

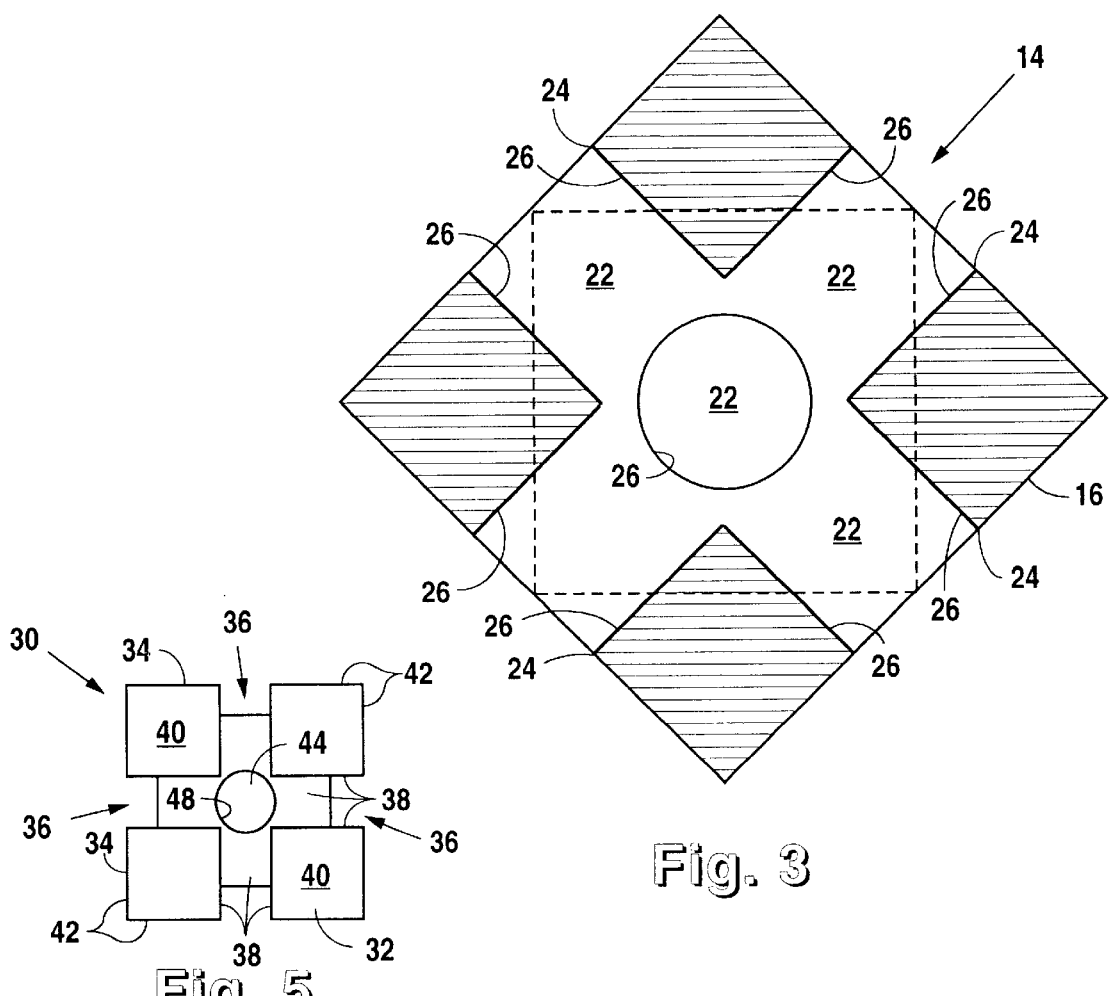
Fig. 3
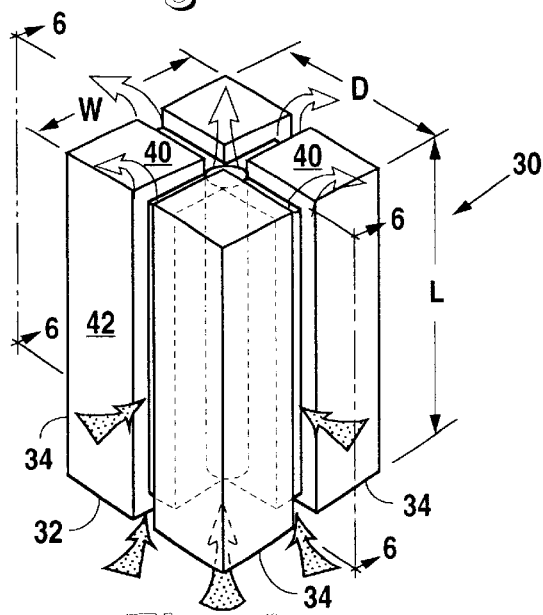
Fig. 5
Fig. 4
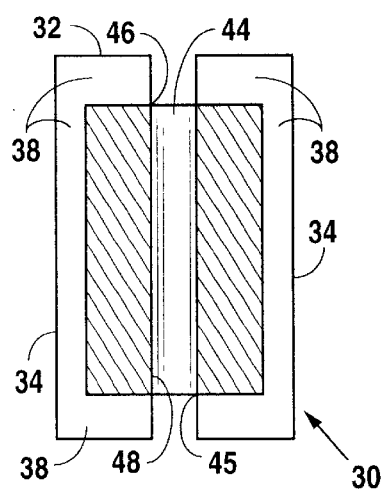
Fig. 6

HYGROSCOPIC MONOLITH

This application is a continuation of Ser. No. 09/157,208, filed Sep. 18, 1998, now U.S. Pat. No. 6,280,504.

BACKGROUND OF THE INVENTION

The present invention relates to dehumidifiers. More particularly, the present invention relates to a hygroscopic material having a shape and surface area orientation which facilitates circulation and drying of a working gas.

Dehumidifiers are used to dry working gases, such as water vapor in air. Typical desiccant dehumidifying machines blow the air or working gas across a desiccant material to remove the vapor from the working gas. These types of machines require a power source and typically utilize moving parts to dry the working space. In addition, the desiccant is typically contained or packaged within the machine and the vapor rich air is mechanically passed across the desiccant. In addition to requiring active intervention to turn the machine ON and OFF, such devices are limited by their power needs, the breakdown of the moving mechanical components, and a somewhat inefficient use of the desiccant material.

SUMMARY OF THE INVENTION

Accordingly, the present invention provides a shaped monolithic hygroscopic material which moves air through a "chimney effect" or air density differences in and around the material. The present invention thus provides a passive dehumidifier which allows direct contact with the gas being dried without the need for an outside power source, moving parts, or packaging of a desiccant material. Alternatively, the tendency of the material to seek equilibrium with the working gas may also be utilized to achieve humidification.

The present invention comprises a hygroscopic material having at least one passageway or channel therethrough. The material is shaped to provide a surface area to facilitate gas flow, and drying of an ambient gas by creating a chimney effect which facilitates mixing of the gas. This causes the heavier water vapor or other compound containing gas to contact adsorbent material adjacent to the passageway or channel, adsorb at least some of the compound, and cause the lighter gas to exit the passageway or channel. The dehumidifier may have various shapes and sizes and can be reactivated to restore its drying capacity. When utilized as a humidifier, the material desorbs or adds the constituent (such as water vapor) to the gas and a downdraft rather than a chimney effect is achieved.

DESCRIPTION OF THE DRAWINGS

FIG. 3 is a cross-sectional view taken along section lines 3—3 of FIG. 2.

FIG. 4 is a perspective view of an alternate embodiment of the present invention illustrating air or other gas flow therethrough.

FIG. 5 is a top view of FIG. 4.

FIG. 6 is a cross sectional view taken along section lines 6—6 of FIG. 4.

DETAILED DESCRIPTION OF THE PREFERRED EMBODIMENT

Figure 1:
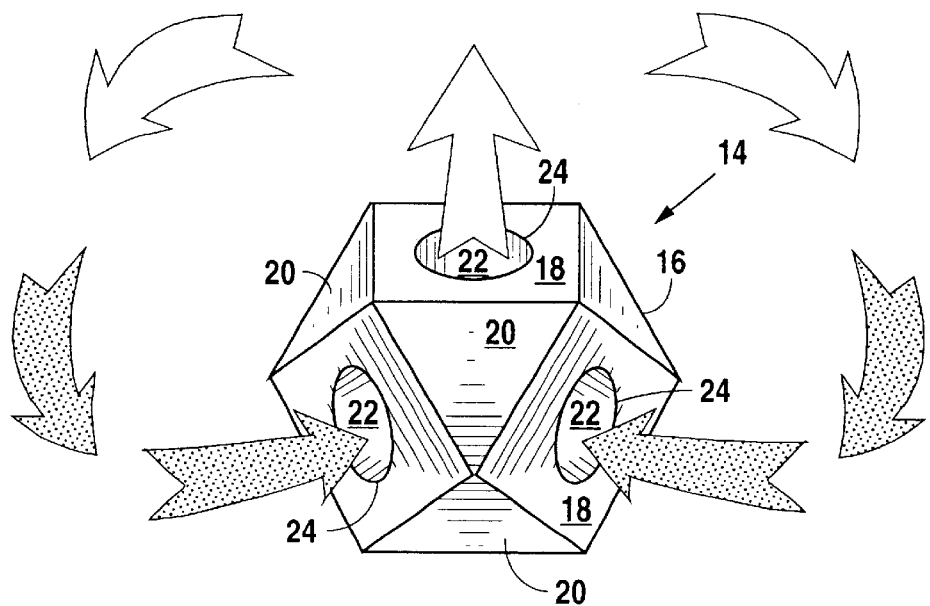
FIG. 1 is a side view of one embodiment of the present invention illustrating flow of air or other gas therethrough.
Figure 2:
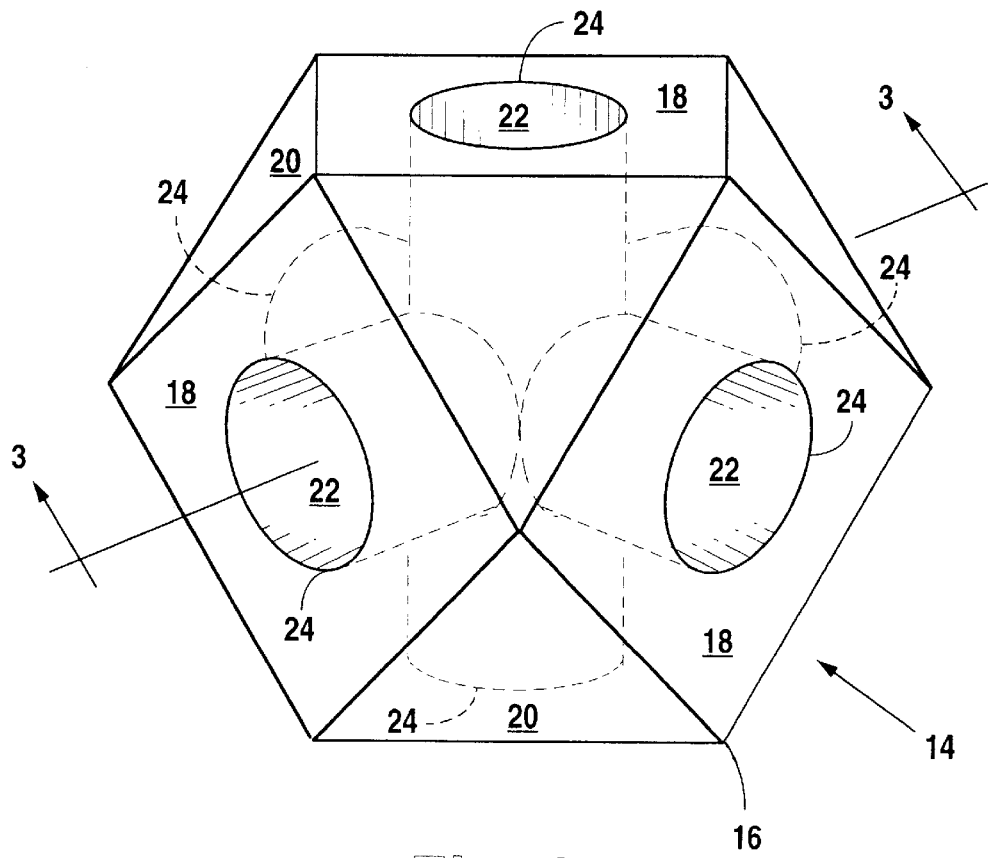
FIG. 2 is a phantom view of FIG. 1.

Referring to FIG. 1, FIG. 2 and FIG. 3, an embodiment of the present invention is identified by the number 14. For purposes of the present description, it will be described in connection with its usage as a dehumidifier 14. The dehumidifier 14 comprises a shaped, monolithic hygroscopic material 16. The material 16 has a plurality of external surface areas which include a plurality of generally square external surfaces 18 and a plurality of generally triangular external surfaces 20. The material 16 has a generally polyhedron or faceted shape.

As further illustrated in FIG. 2, the material 16 has a plurality of channels or passageways 22 therethrough. Each passageway 22 has an inlet port and an outlet port, identified generally by the number 24. Depending upon the orientation of the material 16, any port 24 may function as an inlet port or outlet port. As illustrated in FIG. 3, each passageway 22 has an internal surface 26. Each passageway 22 is generally cylindrical, passes from one side of material 16 to an opposite side, and has a plurality of other passages 22 in fluid communication with and generally perpendicular thereto.

Referring again to FIG. 1, the usage and operation of the dehumidifier 14 will be described in greater detail. The dehumidifier 14 may be placed in any environment having water vapor or other compound or constituent (for which dehumidifier 14 has an affinity) within a working gas, such as air. When the heavier, denser compound/vapor laden gas (dotted arrows) enters an inlet port 24 it is dried by the surface area 26 of the adsorbent material 16 within the corresponding passageway 22. The lighter, drier air (clear arrows) thereafter exits through a port 24. As the dry air rises, a circulation or "chimney" effect is created within the working environment, as illustrated by the arrows in FIG. 1. That is, the lighter, drier air rises from the dehumidifier 14 and the heavier, vapor laden air is circulated to enter the dehumidifier 14 (passages 22) so that the water vapor or other constituent of the gas is adsorbed (or absorbed) by material 16. Surfaces 18 and 20 may also provide some adsorption (or absorption) of the gaseous constituent.

Figure 11:
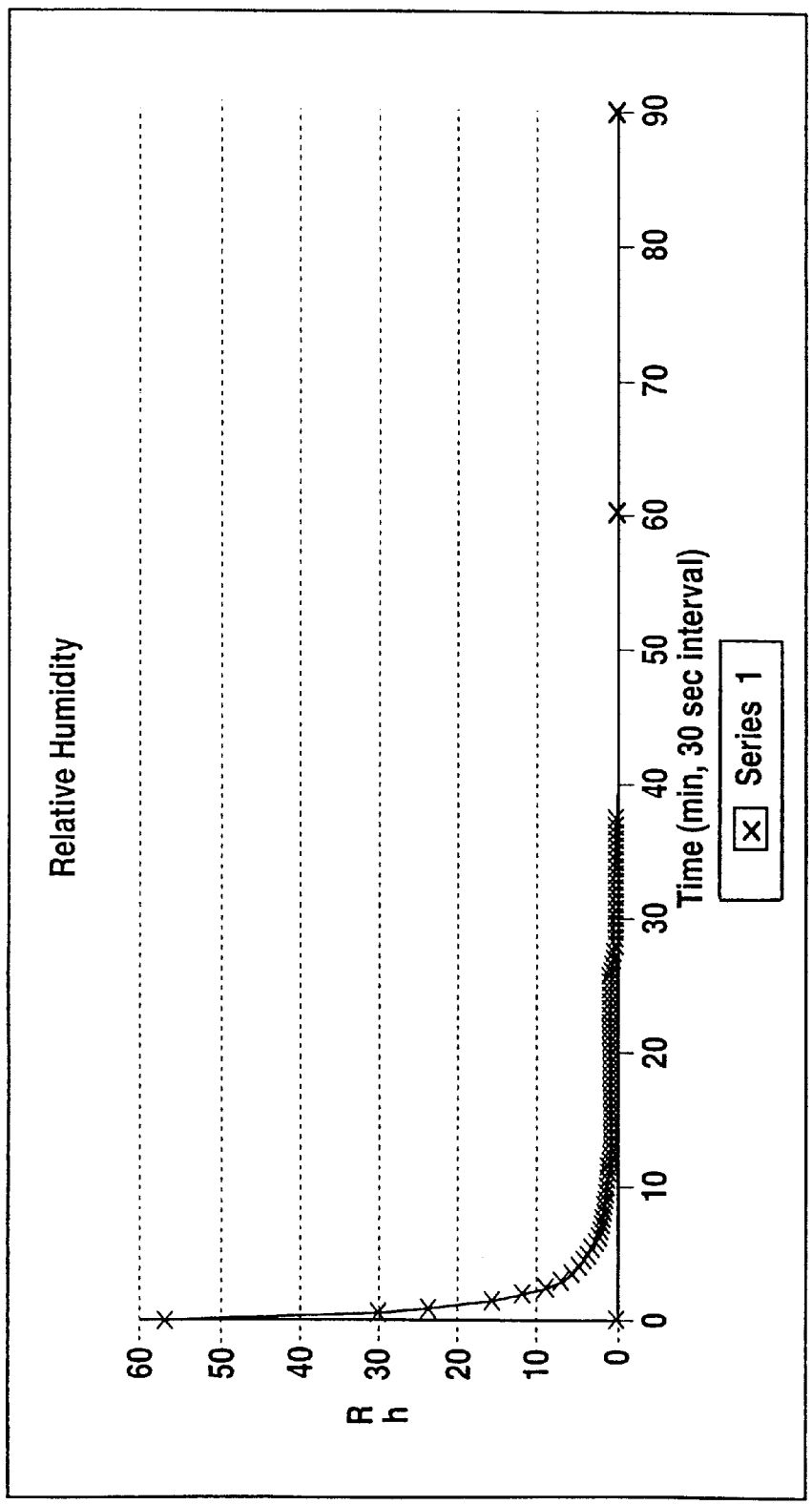
FIG. 11 is a graph illustrating the data reflected in Table 1.

Testing of the embodiment of FIG. 1 yielded the results reflected in Table 1, as graphically depicted in FIG. 11. In the test, a dehumidifier 14 having a mass of approximately 10 grams (natural zeolite) was activated (dried) in a microwave oven and placed in a sealed, one liter glass beaker with a probe for measuring temperature (degrees Fahrenheit), relative humidity (% Rh), dewpoint (degrees Fahrenheit), and absolute humidity (grains per pound). Readings of the probe were taken every thirty seconds. As evidenced by the data collected, the dehumidifier 14 rapidly and efficiently dried the air in the beaker.

TABLE 1

Dehumidification Data, 1 liter air volume, 30 sec interval

|  | Relative Humidity Rh A | Temp T B | Dewpoint Temp. Td C | Absolute Humidity x D | Time t E |
|---|---|---|---|---|---|
| 1 | 57.1 | 75.5 | 59.4 | 75.4 | 0 |
| 2 | 30.2 | 75.5 | 40.6 | 36 | 0.5 |
| 3 | 23.8 | 75.5 | 35.4 | 29.6 | 1 |
| 4 | 15.7 | 75.6 | 25.7 | 19.6 | 1.5 |
| 5 | 11.8 | 75.6 | 18.8 | 15.1 | 2 |
| 6 | 8.9 | 75.7 | 12.4 | 11.6 | 2.5 |
| 7 | 7.1 | 75.7 | 7.5 | 9.15 | 3 |
| 8 | 5.8 | 75.7 | 3.1 | 7.4 | 3.5 |
| 9 | 4.8 | 75.8 | −0.9 | 6.16 | 4 |
| 10 | 4.1 | 75.8 | −4.4 | 5.16 | 4.5 |
| 11 | 3.5 | 75.8 | −7.3 | 4.55 | 5 |
| 12 | 3.1 | 75.8 | −9.9 | 4 | 5.5 |
| 13 | 2.7 | 75.8 | −12.4 | 3.56 | 6 |
| 14 | 2.4 | 75.9 | −14.6 | 3.14 | 6.5 |
| 15 | 2.2 | 75.9 | −16.3 | 3.09 | 7 |
| 16 | 2 | 75.9 | −18.1 | 2.68 | 7.5 |
| 17 | 1.8 | 75.9 | −19.9 | 2.4 | 8 |
| 18 | 1.7 | 75.9 | −21 | 2.26 | 8.5 |
| 19 | 1.6 | 75.9 | −22.4 | 2.1 | 9 |
| 20 | 1.5 | 75.9 | −23.7 | 1.98 | 9.5 |
| 21 | 1.4 | 76 | −24.6 | 1.88 | 10 |
| 22 | 1.3 | 76 | −25.7 | 1.77 | 10.5 |
| 23 | 1.3 | 76 | −26.6 | 1.67 | 11 |
| 24 | 1.2 | 76 | −27.6 | 1.59 | 11.5 |
| 25 | 1.1 | 76 | −28.6 | 1.5 | 12 |
| 26 | 1.1 | 76 | −29.4 | 1.45 | 12.5 |
| 27 | 1 | 76.1 | −30.3 | 1.39 | 13 |
| 28 | 1 | 76.1 | −31 | 1.31 | 13.5 |
| 29 | 1 | 76.1 | −31.6 | 1.31 | 14 |
| 30 | 0.9 | 76.1 | −32.5 | 1.23 | 14.5 |
| 31 | 0.9 | 76.1 | −33.2 | 1.16 | 15 |
| 32 | 0.9 | 76.1 | −33.8 | 1.14 | 15.5 |
| 33 | 0.8 | 76.1 | −34.3 | 1.08 | 16 |
| 34 | 0.8 | 76.1 | −35 | 1.06 | 16.5 |
| 35 | 0.8 | 76.1 | −35.4 | 1.04 | 17 |
| 36 | 0.8 | 76.1 | −36 | 0.99 | 17.5 |
| 37 | 0.7 | 76.1 | −36.5 | 0.98 | 18 |
| 38 | 0.7 | 76.1 | −37 | 0.94 | 18.5 |
| 39 | 0.7 | 76.1 | −37.6 | 0.91 | 19 |
| 40 | 0.7 | 76.1 | −38 | 0.88 | 19.5 |
| 41 | 0.6 | 76.1 | −38.6 | 0.86 | 20 |
| 42 | 0.6 | 76.1 | −39 | 0.83 | 20.5 |
| 43 | 0.6 | 76.1 | −39.7 | 0.81 | 21 |
| 44 | 0.6 | 76.1 | −40 | 0.77 | 21.5 |
| 45 | 0.6 | 76.1 | −40.5 | 0.76 | 22 |
| 46 | 0.6 | 76.1 | −41 | 0.74 | 22.5 |
| 47 | 0.5 | 76.1 | −41.4 | 0.72 | 23 |
| 48 | 0.5 | 76.1 | −41.8 | 0.71 | 23.5 |
| 49 | 0.5 | 76.1 | −42 | 0.69 | 24 |
| 50 | 0.5 | 76.1 | −42.4 | 0.67 | 24.5 |
| 51 | 0.5 | 76.1 | −43 | 0.66 | 25 |
| 52 | 0.5 | 76.1 | −43.3 | 0.65 | 25.5 |
| 53 | 0.5 | 76.1 | −43.7 | 0.63 | 26 |
| 54 | 0.5 | 76.1 | −44.2 | 0.61 | 26.5 |
| 55 | 0.5 | 76.1 | −44.6 | 0.6 | 27 |
| 56 | 0.4 | 76.1 | −45 | 0.59 | 27.5 |
| 57 | 0.4 | 76.2 | −45.3 | 0.58 | 28 |
| 58 | 0.4 | 76.2 | −45.8 | 0.56 | 28.5 |
| 59 | 0.4 | 76.2 | −46 | 0.55 | 29 |
| 60 | 0.4 | 76.2 | −46.2 | 0.54 | 29.5 |
| 61 | 0.4 | 76.2 | −46.8 | 0.53 | 30 |
| 62 | 0.4 | 76.2 | −47 | 0.51 | 30.5 |
| 63 | 0.4 | 76.2 | −47.3 | 0.5 | 31 |
| 64 | 0.4 | 76.2 | −47.7 | 0.5 | 31.5 |
| 65 | 0.4 | 76.2 | −48 | 0.49 | 32 |
| 66 | 0.4 | 76.2 | −48.4 | 0.48 | 32.5 |
| 67 | 0.3 | 76.2 | −48.7 | 0.47 | 33 |
| 68 | 0.3 | 76.2 | −49 | 0.45 | 33.5 |
| 69 | 0.3 | 76.2 | −49.4 | 0.45 | 34 |
| 70 | 0.3 | 76.2 | −49.9 | 0.43 | 34.5 |
| 71 | 0.3 | 76.2 | −50 | 0.42 | 35 |
| 72 | 0.3 | 76.2 | −50.8 | 0.41 | 35.5 |
| 73 | 0.3 | 76.2 | −51 | 0.4 | 36 |
| 74 | 0.3 | 76.2 | −51.6 | 0.39 | 36.5 |
| 75 | 0.3 | 76.2 | −51.8 | 0.39 | 37 |
| 76 |  |  |  |  |  |
| 77 | 0.2 | 76.2 | −60.7 | 0.22 | 61.5 |
| 78 | 0.2 | 76.2 | −61 | 0.21 | 89.5 |

Referring to FIG. 4, FIG. 5 and FIG. 6, an alternate embodiment of the present invention is identified by the number 30. For purposes of the present description, it will be described in connection with its usage as a dehumidifier 30. The dehumidifier 30 comprises a shaped, monolithic hygroscopic material 32. The material 32 has a plurality of generally rectangular columns 34 which define a plurality of external channels 36 therein. Each channel 36 has internal surfaces 38. Channels 36 extend the length L, width W, and depth D of dehumidifier 30 and the length L is generally twice the width W and twice the depth D with the width W and depth D being approximately equal. The material 32 has a generally columnar shape, a plurality of generally square external surfaces 40 and a plurality of generally rectangular external surfaces 42.

Referring again to FIG. 5 and FIG. 6, the material 32 further comprises a cylindrical internal passageway 44 therethrough. Passageway 44 has an inlet port 45 on a first lengthwise end of dehumidifier 30 and an outlet port 46 on a second, opposite lengthwise end of dehumidifier 30. Passageway 44 extends from channel 36 on one lengthwise end of dehumidifier 30 to channel 36 on the opposite lengthwise end and has an internal surface 48. As may be readily understood, ports 44 and 45 may each serve as an inlet port and an outlet port, depending upon the orientation of the dehumidifier 30.

Referring again to FIG. 4, the usage and operation of the dehumidifier 30 will be described in greater detail. The dehumidifier 30 may be placed in any environment having water vapor or other compound or constituent (for which dehumidifier 30 has an affinity) within a working gas, such as air. When the heavier, denser compound/vapor laden gas (dotted arrows) enters the channels 36 it is dried by the surface area 38 of the adsorbent material 32 within the corresponding channel 36. The lighter, drier air (clear arrows) thereafter exits the respective channel 36. Likewise, heavier, denser compound/vapor laden gas (dotted arrows) enters inlet port 45 and is dried by the surface area 48 of the adsorbent material 32 within passageway 44. The lighter, drier air (clear arrows) thereafter exits through exit port 46. As the dry air from channels 36 and passage 44 rises, a circulation or "chimney" effect is created within the working environment, as illustrated by the arrows in FIG. 4. That is, the lighter, drier air rises from the dehumidifier 30 and the heavier, vapor laden air is circulated to enter the dehumidifier 30 (channels 36 and passage 44) so that the water vapor or other constituent of the gas is adsorbed (or absorbed) by material 32. Surfaces 40 and 42 may also provide some adsorption (or absorption) of the gaseous constituent.

Figure 12:
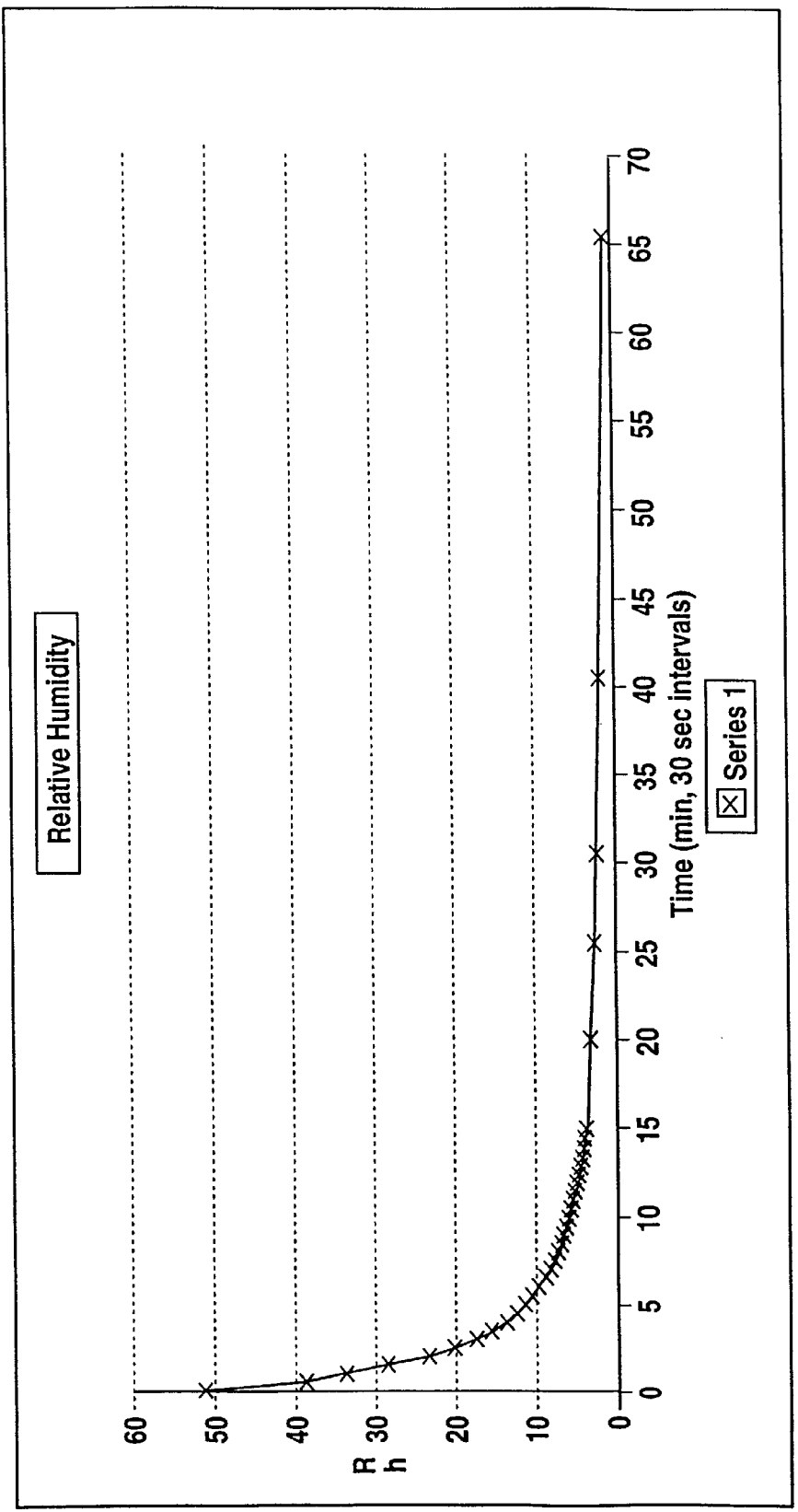
FIG. 12 is a graph illustrating the data reflected in Table 2.

Testing of the embodiment of FIG. 4 yielded the results reflected in Table 2, as graphically depicted in FIG. 12. In the test, a dehumidifier 30 having a mass of approximately 40 grams (natural zeolite) was activated (dried) in a microwave oven and placed in a sealed one liter glass beaker with a probe for measuring temperature (degrees Fahrenheit), relative humidity (% Rh), dewpoint (degrees Fahrenheit), and absolute humidity (grains per pound). Readings of the probe were taken every thirty seconds. As evidenced by the data collected, the dehumidifier 30 rapidly and efficiently dried the air in the beaker.

TABLE 2

Dehumidification Data, 1 liter air volume, 30 sec interval

| | Relative Humidity Rh A | Temp T B | Dewpoint Temp. Td C | Absolute Humidity X D | Time t E |
|---|---|---|---|---|---|
| 1 | 51.1 | 68.2 | 49.4 | 52.2 | 0 |
| 2 | 38.7 | 68.5 | 41.8 | 38.5 | 0.5 |
| 3 | 33.7 | 68.6 | 38.5 | 33.9 | 1 |
| 4 | 28.3 | 68.8 | 34.4 | 28.9 | 1.5 |
| 5 | 23.3 | 68.8 | 29.8 | 24 | 2 |
| 6 | 20.3 | 68.9 | 26.3 | 20.7 | 2.5 |
| 7 | 17.4 | 69 | 22.8 | 17.9 | 3 |
| 8 | 15.7 | 69.1 | 20.5 | 16.2 | 3.5 |
| 9 | 13.6 | 69.2 | 17.3 | 14.2 | 4 |
| 10 | 12.4 | 69.3 | 15.1 | 12.9 | 4.5 |
| 11 | 11.3 | 69.3 | 13.3 | 11.9 | 5 |
| 12 | 10.5 | 69.4 | 11.5 | 11 | 5.5 |
| 13 | 9.7 | 69.5 | 9.8 | 10.2 | 6 |
| 14 | 8.9 | 69.6 | 8.3 | 9.51 | 6.5 |
| 15 | 8.4 | 69.7 | 6.6 | 8.82 | 7 |
| 16 | 7.9 | 69.7 | 5.5 | 8.4 | 7.5 |
| 17 | 7.4 | 69.8 | 4.3 | 7.91 | 8 |
| 18 | 7 | 69.9 | 3 | 7.48 | 8.5 |
| 19 | 6.6 | 69.9 | 1.9 | 7.09 | 9 |
| 20 | 6.3 | 70 | 1 | 6.76 | 9.5 |
| 21 | 6 | 70.1 | 0 | 6.48 | 10 |
| 22 | 5.8 | 70.2 | −0.9 | 6.2 | 10.5 |
| 23 | 5.5 | 70.2 | −1.9 | 5.93 | 11 |
| 24 | 5.2 | 70.3 | −2.8 | 5.67 | 11.5 |
| 25 | 5 | 70.4 | −3.6 | 5.45 | 12 |
| 26 | 4.8 | 70.4 | −4.4 | 5.26 | 12.5 |
| 27 | 4.7 | 70.5 | −5.1 | 5.08 | 13 |
| 28 | 4.5 | 70.5 | −5.8 | 4.89 | 13.5 |
| 29 | 4.3 | 70.5 | −6.5 | 4.73 | 14 |
| 30 | 4.2 | 70.6 | −7.2 | 4.57 | 14.5 |
| 31 | 4 | 70.6 | −7.9 | 4.43 | 15 |
| 32 | 3.2 | 70.5 | −13 | 3.43 | 20 |
| 33 | 2.7 | 70 | −16.1 | 2.93 | 25.5 |
| 34 | 2.5 | 70.1 | −18.1 | 2.66 | 30.5 |
| 35 | 2.3 | 70.6 | −19.4 | 2.49 | 40.5 |
| 36 | 1.3 | 70.3 | −29.6 | 1.42 | 65.5 |

Figure 7:
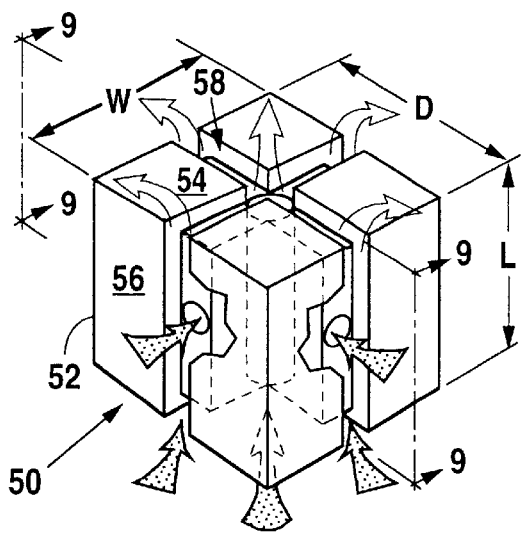
FIG. 7 is a perspective view of a further alternate embodiment of the present invention illustrating air or other gas flow therethrough.
Figure 8:
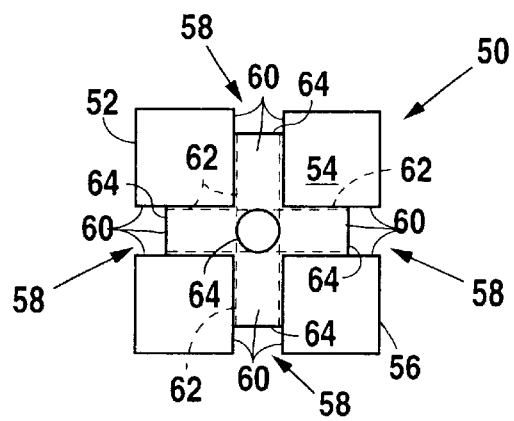
FIG. 8 is a top view of FIG. 7.
Figure 9:
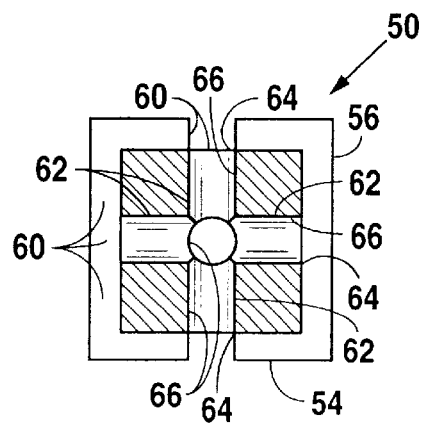
FIG. 9 is a cross sectional view taken along section lines 9—9 of FIG. 7.

Referring to FIG. 7, FIG. 8 and FIG. 9, another embodiment of the present invention is identified by the number 50. For purposes of the present description, it will be described in connection with its usage as a dehumidifier 50. The dehumidifier 50 comprises a shaped, monolithic hygroscopic material 52. The material 52 has a plurality of external surface areas which include a plurality of generally square external surfaces 54 and a plurality of generally rectangular surface areas 56.

As further illustrated in FIG. 7 and FIG. 8, the material 52 has a plurality of channels 58 therein. Each channel 58 has internal surfaces 60. Channels 58 extend the length L, width W, and depth D of dehumidifier 50 with the length L, width W and depth D being approximately equal so as to form a generally cubed shape.

Referring again to FIG. 8 and FIG. 9, the material 52 has a plurality of passageways 62 therethrough. Each passageway 62 has an inlet port and an outlet port, identified by the number 64. Depending upon the orientation of the material 52, any port 64 may function as an inlet port or outlet port.

Each passageway 62 has an internal surface 66. Each passageway 62 is generally cylindrical, passes from one side of material 52 to an opposite side, and it has a plurality of other passages 62 in fluid communication with and generally perpendicular thereto.

Referring again to FIG. 7, the usage and operation of the dehumidifier 50 will be described in greater detail. The dehumidifier 50 may be placed in any environment having water vapor or other compound or constituent (for which dehumidifier 50 has an affinity) within a working gas, such as air. When the heavier, denser compound/vapor laden gas (dotted arrows) enters an inlet port 64, it is dried by the surface area of the adsorbent or hygroscopic material 52 within the corresponding passageway 62. The lighter, drier air (clear arrows) thereafter exits through a port 64. As the dry air rises, a circulation or "chimney" effect is created within the working environment, as illustrated by the arrows in FIG. 7. That is, the lighter, drier air rises from the dehumidifier 50 and the heavier, vapor laden air is circulated to enter the dehumidifier 50 (through channels 58 or passages 62) so that the water vapor or other constituent of the gas is adsorbed (or absorbed) by material 52. Surfaces 54 and 56 may also provide some adsorption (or absorption) of the gaseous constituent.

It is to be understood that the dehumidifiers 14, 30, and 50 may be constructed of various shapes and sizes depending upon the working space to be dried. Further, the dehumidifiers 14 and 50 may be "tossed" into an enclosed space, such as a case, and will always land and sit "upright" regardless of how they land. That is, the orientation of the dehumidifiers 14 and 50 is always consistent and appropriate regardless of which "side" they rest upon. It is also to be understood that the material 16, 32 and 52 may be natural zeolite and that the dehumidifiers of the present invention may be useful in archival of museum, photographic, and other environmentally sensitive material, and protective storage of industrial equipment, and any generally enclosed space in which the humidity or concentration of a gaseous compound is of concern. The material 16, 32 and 52 may be shaped and the channels and passages within the material 16, 32 and 52 may be formed by machining, extruding or pressing.

The present invention thus also provides a process for dehumidifying a gas in an enclosed space, comprising the steps of forming a hygroscopic or adsorbent material into a shape which may be received within the space and to circulate and dry the gas in a desired manner, such as by the chimney effect described herein, activating or otherwise preparing or conditioning the material, such as by drying, and placing the material within the enclosed space. When the material has dried or otherwise adsorbed a sufficient or maximum amount of compound, it may be removed from the enclosed space, reactivated through further drying, and replaced within the enclosed space for additional drying of the space. Alternatively, the material may be reactivated or dried within the enclosed space without removal therefrom.

Figure 10:
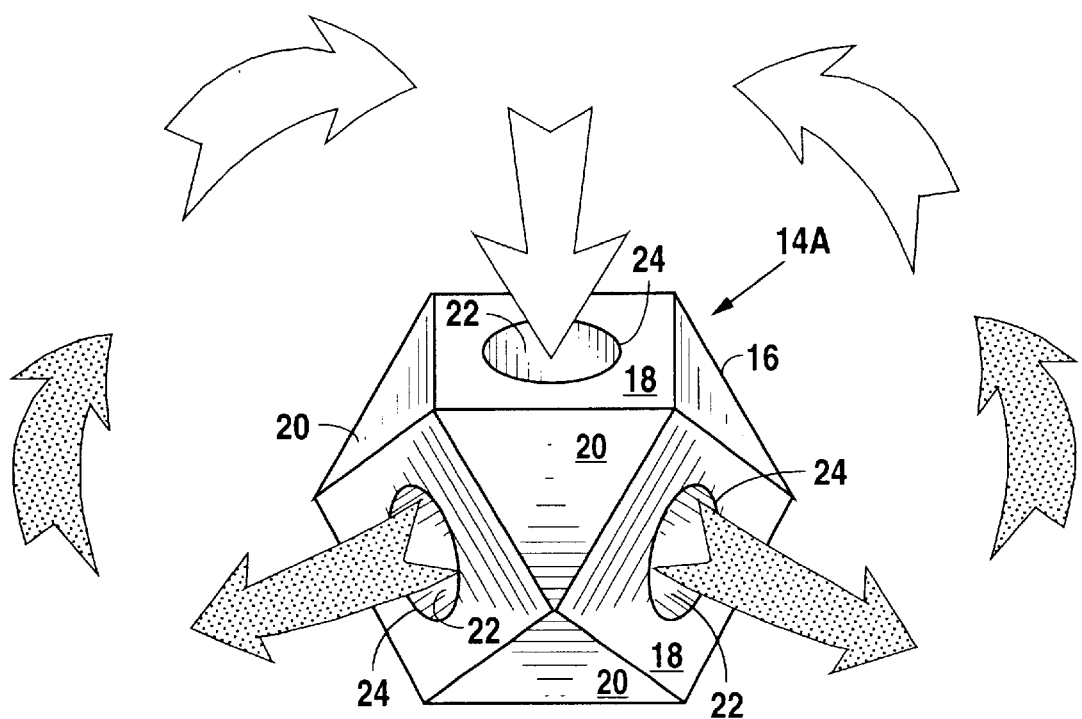
FIG. 10 is a side view of an embodiment of the present invention utilized as a humidifier and illustrating alternate flow of air or other gas therethrough.

It is to be appreciated that the hygroscopic monolith of the present invention will seek equilibrium with the compound or constituent laden gas within the working space, such activity being facilitated by the shape and surface area of the monolith so as to passively interact with the gaseous environment. As such, the hygroscopic monolith of the present invention may also be used to humidify or otherwise provide a gaseous compound or constituent to a working space. The monolith is charged or conditioned by saturating the monolith with the water or other compound or constituent and placing it within the space having a drier humidity or other ability or affinity to cause the water or other compound/ constituent to mix with the gas. In this environment, a downdraft, rather than a chimney effect, is created. As illustrated in FIG. 10, the dehumidifier 14 may be utilized as a humidifier 14A such that the drier air (clear arrows) enters the humidifier 14A (passages 22) and water vapor or other compound or constituent is adsorbed by the gas and flows outward from the humidifier 14A (dotted arrows). Similar results can be obtained by saturating the hygroscopic material of FIG. 4 or FIG. 7.

It is to be understood that the present invention provides the ability to facilitate the chimney effect or downdraft effect provided by the hygroscopic monolith so as to modify the composition of a gas in an enclosed space and in a desired manner. For example, when dehumidification is desired, a greater surface area but smaller mass of the hygroscopic material generally results in a quicker drying but less drying capacity. Likewise, a smaller surface area but a greater mass generally provides slower drying but a greater drying capacity. Also, when used as a dehumidifier, the hygroscopic monolith of the present invention is preferably placed in the bottom of an enclosure and when used as a humidifier, it is preferably placed in the top of an enclosure. It is also to be understood that the channels and passageways in the hygroscopic monolith provide a high surface to volume ratio and may be positioned to facilitate air density differences in and around the monolith in the manner described herein.

While the hygroscopic monolith of the present invention has been described in connection with preferred embodiments, it is not intended to limit the invention to the particular form set forth, but on the contrary, it is intended to cover such alternatives, modifications, and equivalents as may be included within the spirit and scope of the invention as defined by the appended claims.

I claim:

1. A hygroscopic monolith, comprising a hygroscopic material, said material having a plurality of generally flat polygonal-shaped exterior surfaces, said material having a generally straight passage therethrough positioned to facilitate gas density differences, said material being shaped to facilitate mixing of a gas containing a compound by a chimney effect, whereby a first portion of said gas contacts an internal surface of said passage, at least some of said compound is adsorbed by the material, and a second portion of said gas, containing less compound than the first portion, exits said passage.

2. A hygroscopic monolith, as recited in claim 1, wherein said passage is generally cylindrical.

3. A hygroscopic monolith, as recited in claim 1, wherein said internal surface of said passage is generally smooth.

4. A hygroscopic monolith, as recited in claim 1, wherein said passage defines a cavity within said material extending from a first side of said material to a second side of said material.

5. A dehumidifier, comprising an adsorbent material for water vapor, said material having a plurality of exterior surface, said material having a generally straight passage therethrough positioned to facilitate gas density differences, said material being shaped to provide a surface area for adsorption of water vapor from an ambient gas and facilitating mixing of said gas by a chimney effect, whereby a portion of said water vapor containing gas contacts said material within said passage, at least some of said water vapor is adsorbed, and a portion of said gas exits said passage.

6. A dehumidifier, as recited in claim 5, wherein said passage is generally cylindrical.

7. A dehumidifier, as recited in claim 5, wherein said passage is generally smooth.

8. A dehumidifier, as recited in claim 5, wherein said passage defines a cavity within said material extending from a first side of said material to a second side of said material.

9. A dehumidifier, comprising an adsorbent material for water vapor, said material having a plurality of exterior surfaces, said material having a plurality of generally straight passages therethrough positioned to facilitate gas density differences, said material being shaped for adsorption of water vapor from an ambient gas and facilitating mixing of said gas by a chimney effect, whereby a portion of said water vapor containing gas contacts said material within said passages, at least some of said water vapor is adsorbed, and a portion of said gas exits said passages.

10. A dehumidifier, as recited in claim 9, wherein said passages are generally cylindrical.

11. A dehumidifier, as recited in claim 9, wherein said passages are generally smooth.

12. A dehumidifier, as recited in claim 9, wherein said passages define cavities within said material extending from a first side of said material to a second side of said material.

13. A hygroscopic monolith, comprising a hygroscopic material having a passage therethrough positioned to facilitate gas density differences, said passage defining a cavity within said material extending from a first side of said material to a second side of said material, said material being shaped to facilitate mixing of a gas containing a compound by a chimney effect, whereby a first portion of said gas contacts an internal surface of said passage, at least some of said compound is adsorbed by the material, and a second portion of said gas, containing less compound than the first portion, exits said passage.

14. A process for modifying gas in an enclosed space, comprising the steps of:

forming a hygroscopic material into a shape which is received within said space, said material having a plurality of generally flat polygonal-shaped exterior surfaces, said material having a generally straight passage therethrough positioned to facilitate gas density differences, thereby providing a chimney effect or a downdraft effect;

preparing said material to adsorb or desorb a constituent within said gas; and placing said material within said enclosed space.

15. A process for dehumidifying gas in an enclosed space, comprising the steps of:

forming an adsorbent material for water vapor into a shape which is received within said space, said material having a plurality of exterior surfaces, said material having a generally straight passage therethrough positioned to facilitate gas density differences, thereby providing a chimney effect, whereby said gas density differences facilitate adsorption of water vapor by an internal surface of said passage;

activating said material; and placing said material within said enclosed space.

* * * * *